(12) United States Patent
Nakahara

(10) Patent No.: US 9,110,238 B2
(45) Date of Patent: Aug. 18, 2015

(54) OCULAR OPTICAL SYSTEM AND IMAGE PICK-UP APPARATUS INCORPORATING THE SAME

(71) Applicant: CANON KABUSHIKI KAISHA, Tokyo (JP)

(72) Inventor: Seiji Nakahara, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/279,136

(22) Filed: May 15, 2014

(65) Prior Publication Data

US 2014/0340558 A1    Nov. 20, 2014

(30) Foreign Application Priority Data

May 20, 2013  (JP) .................................. 2013-106061

(51) Int. Cl.
| | | |
|---|---|---|
| G02B 25/00 | (2006.01) | |
| G02B 3/02 | (2006.01) | |
| G02B 9/14 | (2006.01) | |
| G02B 9/16 | (2006.01) | |
| H04N 5/232 | (2006.01) | |
| G02B 13/18 | (2006.01) | |
| G02B 13/00 | (2006.01) | |
| G02B 9/12 | (2006.01) | |

(52) U.S. Cl.
CPC *G02B 9/16* (2013.01); *G02B 13/18* (2013.01); *H04N 5/23293* (2013.01); *G02B 9/12* (2013.01); *G02B 13/0035* (2013.01); *G02B 25/001* (2013.01)

(58) Field of Classification Search
CPC ...... G02B 13/0035; G02B 13/18; G02B 9/12; G02B 25/001
USPC .................... 359/645, 716, 785, 790
See application file for complete search history.

(56) References Cited

U.S. PATENT DOCUMENTS

| | | | | |
|---|---|---|---|---|
| 5,151,823 | A * | 9/1992 | Chen .............................. | 359/565 |
| 6,847,494 | B2 * | 1/2005 | Cahall ........................... | 359/690 |
| 7,301,712 | B2 * | 11/2007 | Kamo ........................... | 359/785 |
| 7,969,658 | B2 | 6/2011 | Nishio et al. | |
| 2002/0027710 | A1 * | 3/2002 | Yonetani et al. .............. | 359/434 |
| 2008/0267609 | A1 * | 10/2008 | Takato .......................... | 396/382 |
| 2010/0290129 | A1 * | 11/2010 | Nishio et al. .................. | 359/645 |
| 2012/0038991 | A1 * | 2/2012 | Miyano ......................... | 359/643 |
| 2012/0099206 | A1 * | 4/2012 | Kubota ......................... | 359/645 |
| 2012/0224271 | A1 * | 9/2012 | Matsuo ......................... | 359/716 |
| 2014/0198391 | A1 * | 7/2014 | Sato et al. .................... | 359/645 |
| 2015/0077858 | A1 * | 3/2015 | Mouri et al. .................. | 359/643 |

FOREIGN PATENT DOCUMENTS

JP    2010-175795 A    8/2010

* cited by examiner

*Primary Examiner* — Evelyn A Lester

(74) *Attorney, Agent, or Firm* — Canon USA Inc IP Division

(57) ABSTRACT

An ocular optical system used to view an image displayed on an image display surface, which includes a first lens having positive refractive power, a second lens of meniscus shape having negative refractive power with its concave surface facing the image display surface side, and a third lens having positive refractive power arranged in this order from the image display surface side to a viewer side. A focal length of the first lens, a focal length of the second lens and a focal length of the entire system need to be determined suitably.

6 Claims, 9 Drawing Sheets

OCULAR OPTICAL SYSTEM AND IMAGE PICK-UP APPARATUS INCORPORATING THE SAME

BACKGROUND

1. Field of Art

The present disclosure relates to an ocular optical system and an image pick-up apparatus incorporating the same. For example, the present disclosure relates to an ocular optical system suited to viewing a display panel in an electronic viewfinder.

2. Description of the Related Art

In an electronic viewfinder of an image pick-up apparatus, such as a digital camera and a video camera, an ocular optical system is used for viewing a display panel on which an image of a subject is displayed. As an example, an ocular optical system consisting of three lenses, i.e., a positive lens, a negative lens and a positive lens, arranged in this order from an image display surface side to a viewer side is proposed.

U.S. Pat. No. 7,969,658 discloses an ocular optical system consisting of three lenses, i.e., a positive lens of meniscus shape with its concave surface facing an image display surface side, a negative lens of meniscus shape with its concave surface facing the image display surface side, and a positive lens of biconvex shape, arranged in this order from the image display surface side to a viewer side.

Japanese Patent Laid-Open No. 2010-175795 discloses an ocular optical system consisting of three lenses, i.e., a positive lens of biconvex shape, a negative lens with its concave surface facing an image display surface side, and a positive lens with its convex surface facing a viewer side, arranged in this order from the image display surface side to a viewer side.

SUMMARY

An ocular optical system of the present disclosure is an ocular optical system used to view an image displayed on an image display surface, including: a first lens having positive refractive power, a second lens of meniscus shape having negative refractive power with its concave surface facing the image display surface side, and a third lens having positive refractive power arranged in this order from the image display surface side to a viewer side, wherein, when f1 denotes a focal length of the first lens, f2 denotes a focal length of the second lens and f denotes a focal length of the entire system, the following conditional expressions are satisfied:

$$0.82 < f1/f < 1.07 \text{ and}$$

$$-0.67 < f2/f < -0.51.$$

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings. An ocular optical system according to an aspect of the present invention is used, for example, to view an image displayed on an image display surface of a display panel, which is a liquid crystal display panel, an organic EL display panel, or other display panel, used in an electronic viewfinder. The ocular optical system includes a first lens having positive refractive power, a second lens of meniscus shape having negative refractive power with its concave surface facing the image display surface side, and a third lens having positive refractive power arranged in this order from the image display surface side to a viewer side. The first lens has a meniscus shape with its concave surface facing the image display surface side. The third lens has a biconvex shape.

Figure 1:
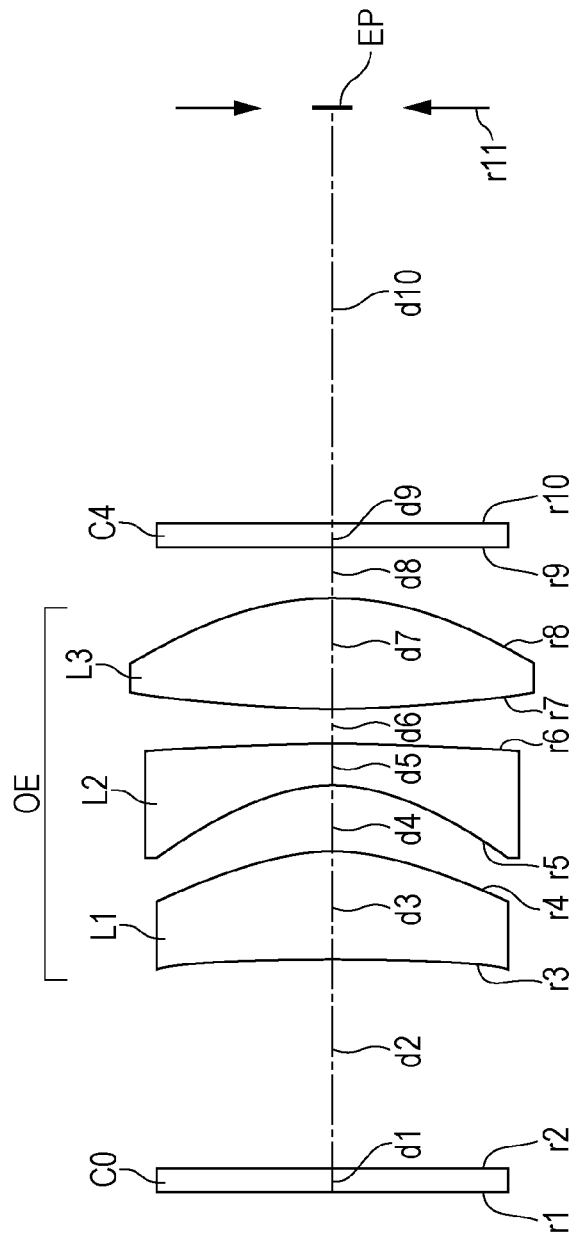
FIG. 1 is a cross-sectional view of lenses of an ocular optical system according to a first embodiment of the present invention.
Figure 2:
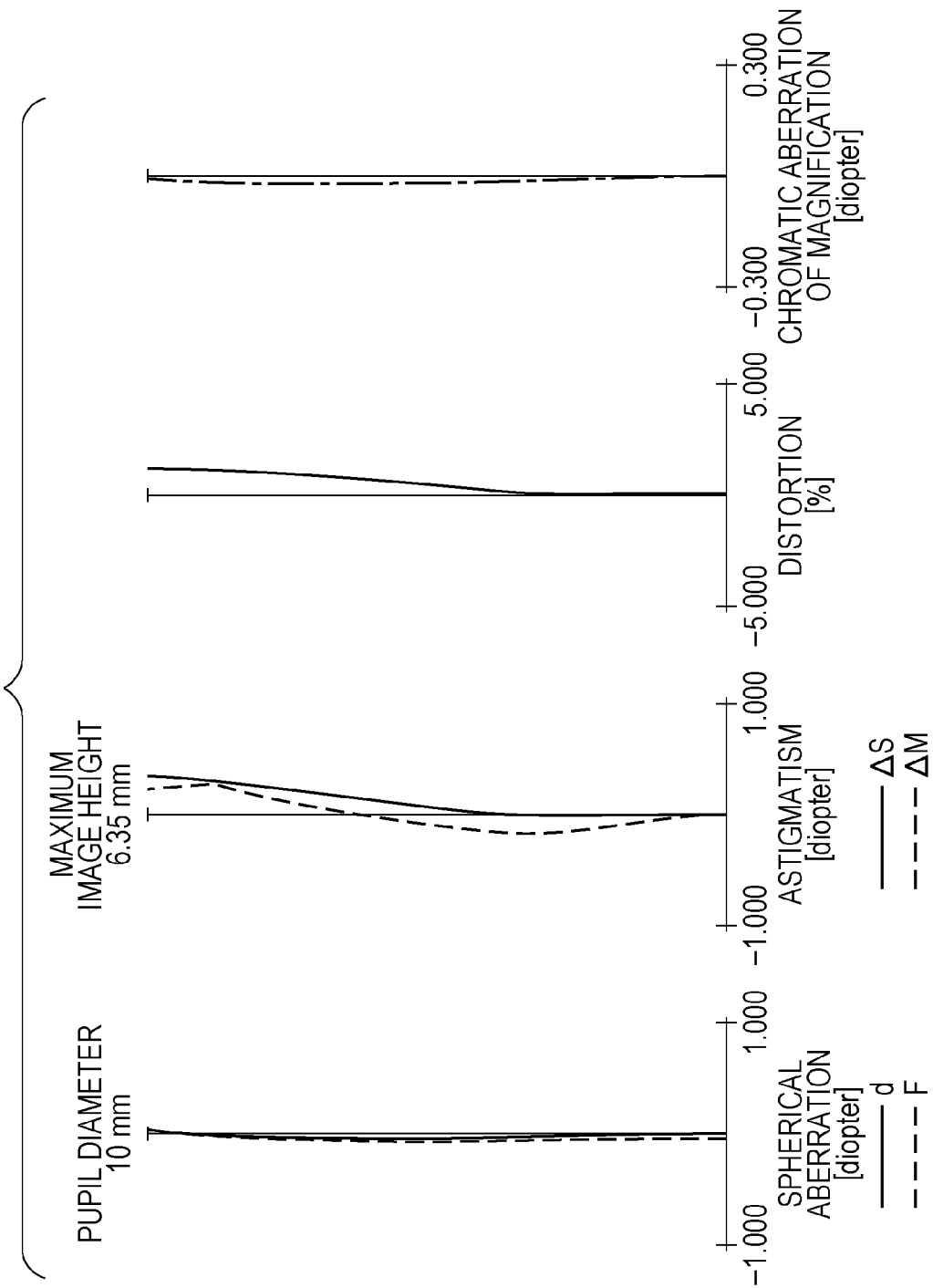
FIG. 2 illustrates aberration charts of the ocular optical system according to the first embodiment of the present invention.
Figure 3:
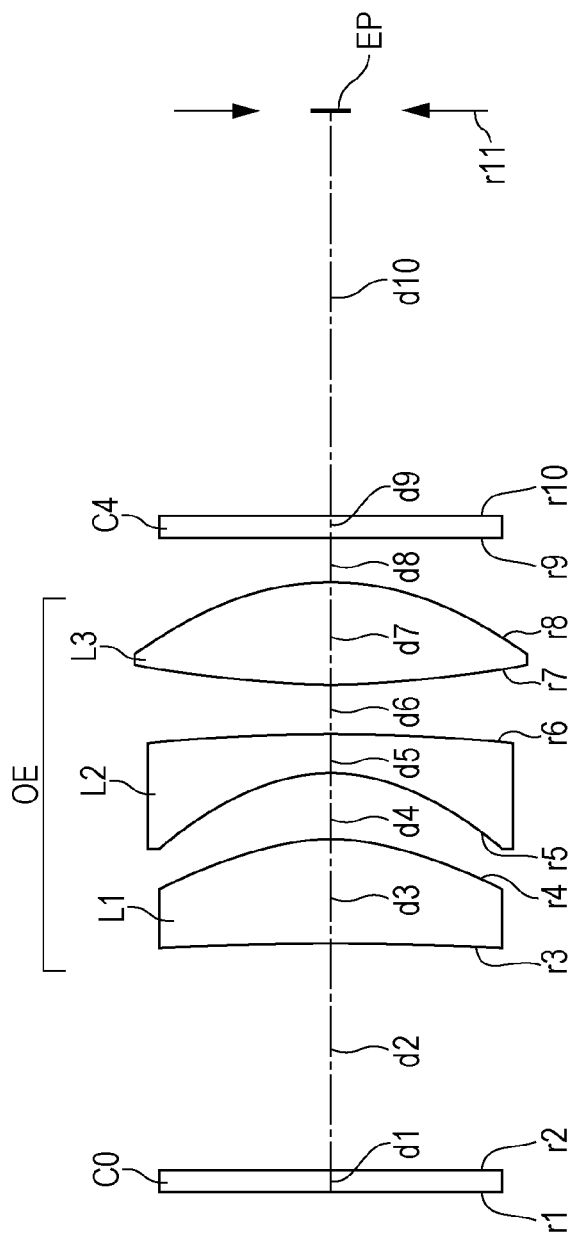
FIG. 3 is a cross-sectional view of lenses of an ocular optical system according to a second embodiment of the present invention.
Figure 4:
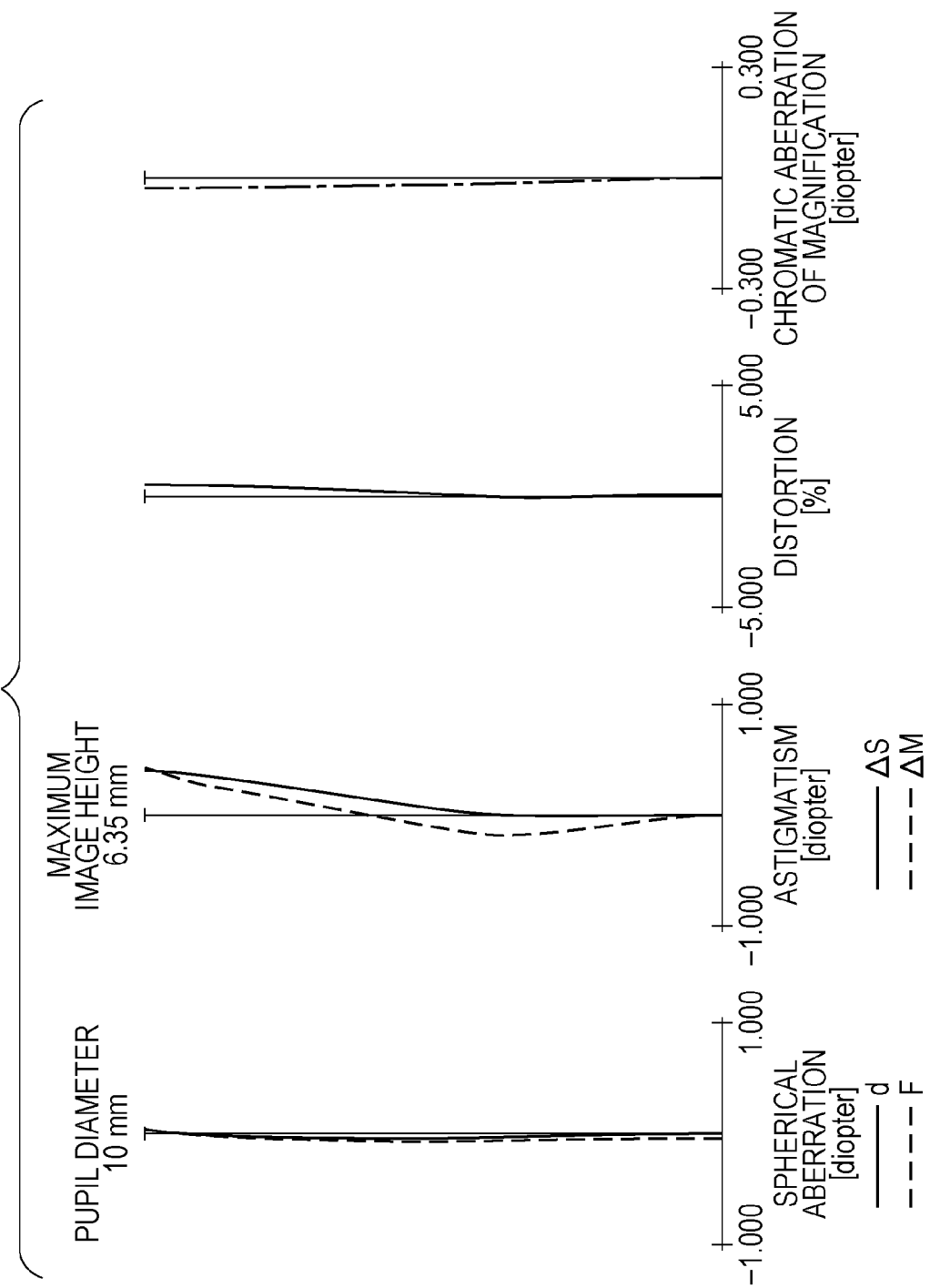
FIG. 4 illustrates aberration charts of the ocular optical system according to the second embodiment of the present invention.
Figure 5:
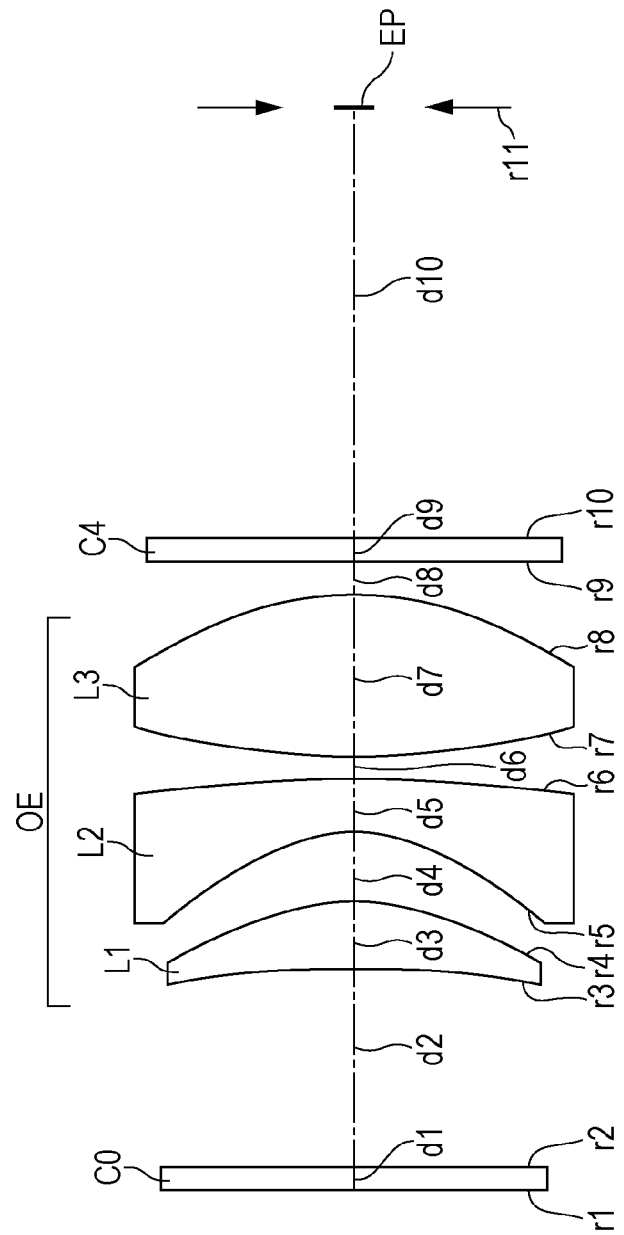
FIG. 5 is a cross-sectional view of lenses of an ocular optical system according to a third embodiment of the present invention.
Figure 6:
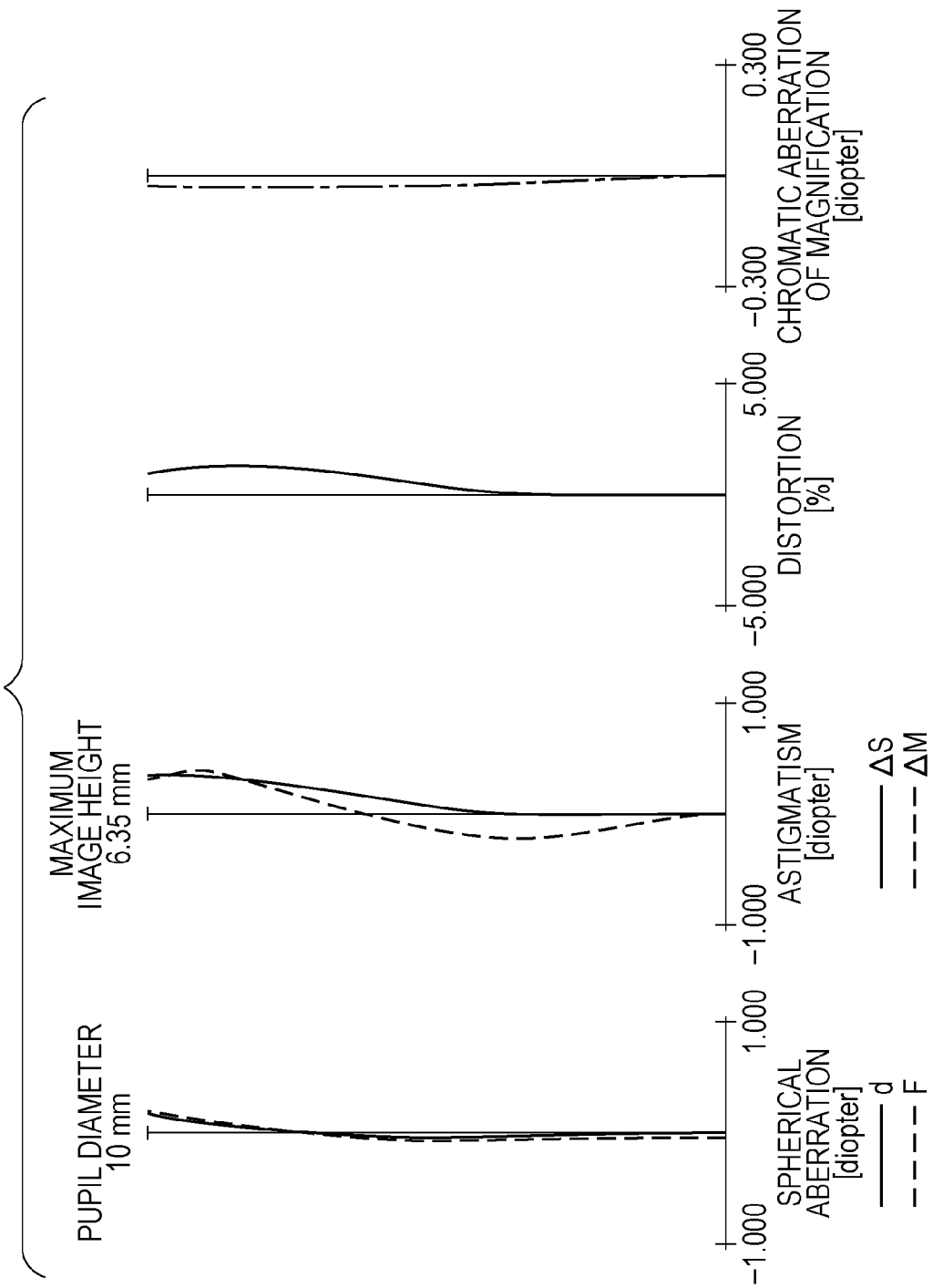
FIG. 6 illustrates aberration charts of the ocular optical system according to the third embodiment of the present invention.
Figure 7:
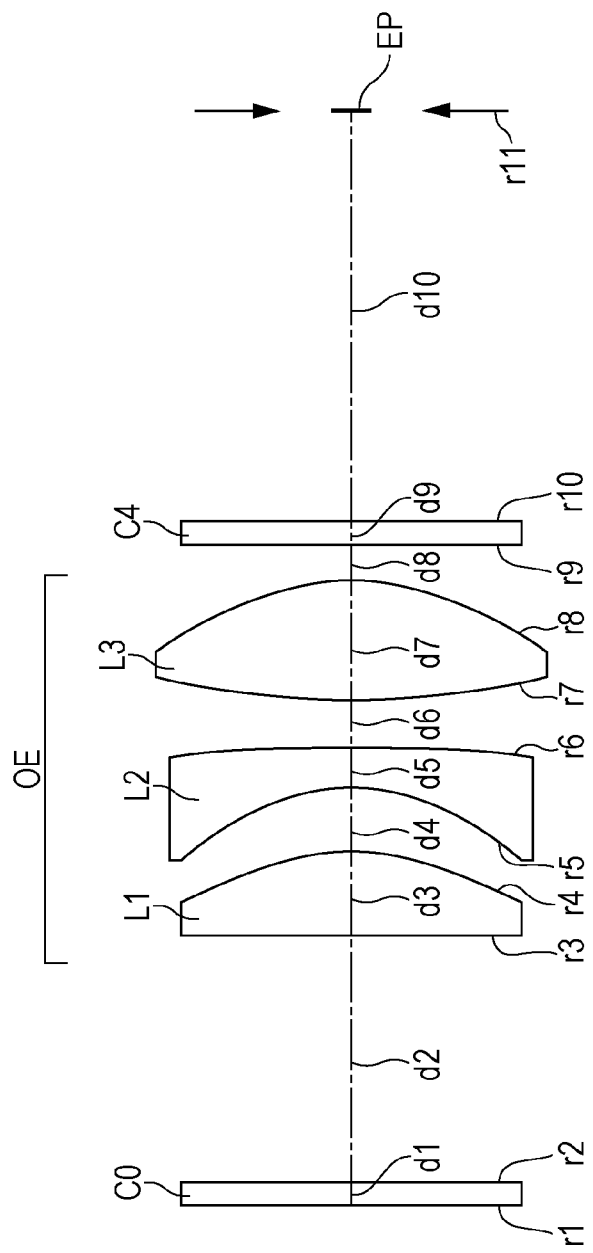
FIG. 7 is a cross-sectional view of lenses of an ocular optical system according to a fourth embodiment of the present invention.
Figure 8:
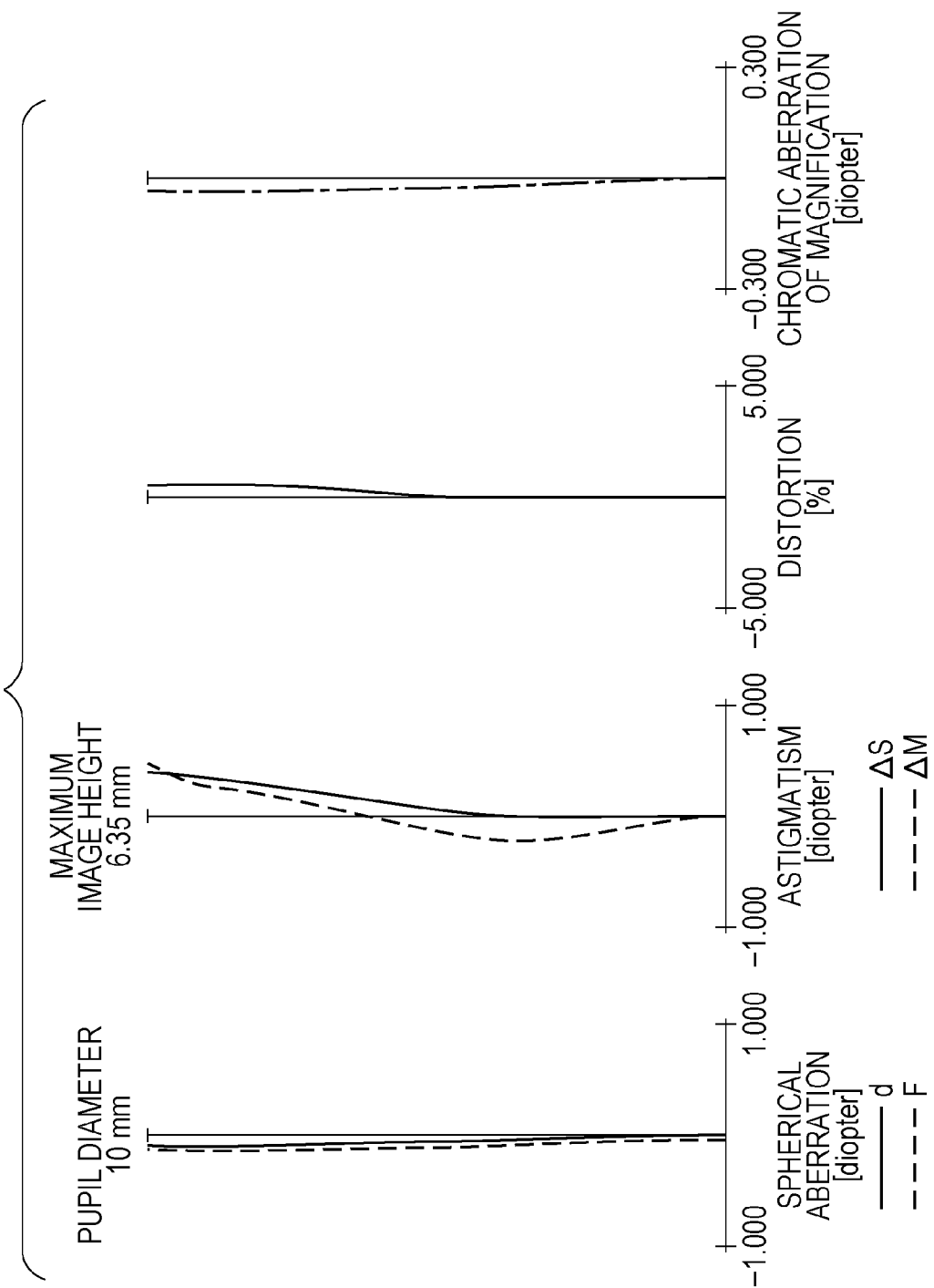
FIG. 8 illustrates aberration charts of the ocular optical system according to the fourth embodiment of the present invention.
Figure 9:
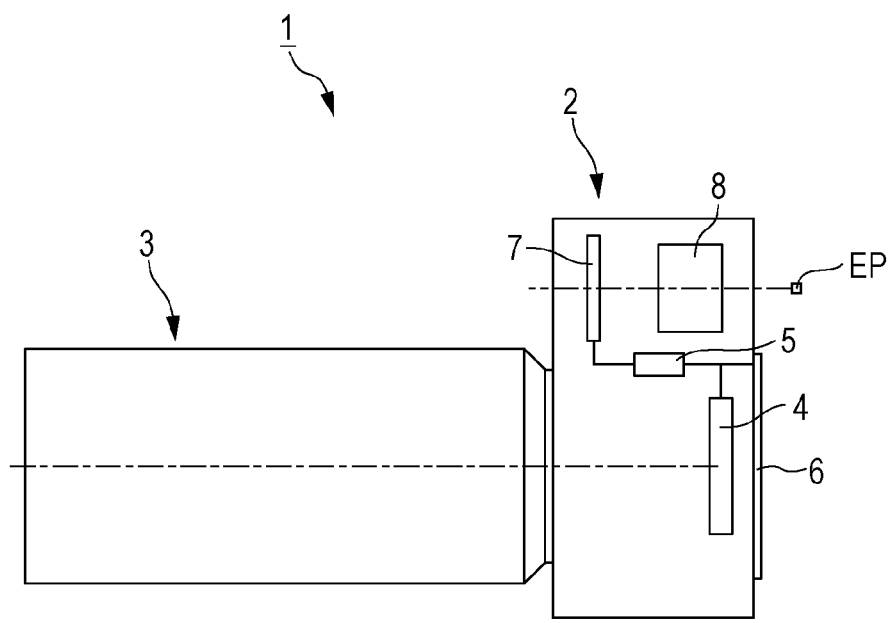
FIG. 9 is a schematic diagram of a main part of an image pick-up apparatus of the present invention.

FIG. 1 is a cross-sectional view of lenses illustrating a lens configuration of an ocular optical system according to a first embodiment of the present invention. FIG. 2 illustrates aberration charts of the ocular optical system according to the first embodiment of the present invention. FIG. 3 is a cross-sectional view of lenses illustrating a lens configuration of an ocular optical system of a second embodiment of the present invention. FIG. 4 illustrates aberration charts of the ocular optical system according to the second embodiment of the present invention. FIG. 5 is a cross-sectional view of lenses illustrating a lens configuration of an ocular optical system according to a third embodiment of the present invention. FIG. 6 illustrates aberration charts of the ocular optical system of the third embodiment of the present invention. FIG. 7 is a cross-sectional view of lenses illustrating a lens configuration of an ocular optical system of a fourth embodiment of the present invention. FIG. 8 illustrates aberration charts of the ocular optical system of the fourth embodiment of the present invention. FIG. 9 is a schematic diagram of a main part of an image pick-up apparatus of an embodiment of the present invention.

An ocular optical system of each embodiment is used in an electronic viewfinder of an image pick-up apparatus, such as a digital camera and a video camera. In each cross-sectional view of the lenses, the left side corresponds to a display panel side (an image display surface side) and the right side corresponds to a viewer side (an exit pupil side). In the cross-sectional view of the lenses, OE denotes an ocular optical system and C0 denotes a display panel, which is a liquid crystal display panel, an organic EL display panel, or other display panel. L1 denotes a first lens having positive refractive power, L2 denotes a second lens having negative refractive power, and L3 denotes a third lens having positive refractive power. C4 denotes a protective glass member made of a transparent material. EP denotes an eye point (an exit pupil) for viewing.

In each aberration chart, a finder diopter is set to −1 diopter (which is a standard diopter). In a spherical aberration diagram, d denotes a d-line (wavelength: 587.6 nm) and F denotes an F-line (wavelength: 486.1 nm). In an astigmatism diagram, ΔS denotes a sagittal image surface of the d-line and ΔM denotes a meridional image surface of the d-line. Chromatic aberration of magnification is illustrated about the F-line.

In a case in which a small-sized display panel having diagonal length of about 10 mm to 15 mm is viewed as an enlarged image using an ocular optical system of which viewing angle (viewing angle) is 30 degrees or greater, the ocular optical system should have high positive refractive power. If the ocular optical system is configured to have high positive refractive power, various aberrations, such as curvature of field and distortion aberration, may often occur and correction of these various aberrations is difficult. If curvature of field and distortion aberrations often occur, optical performance of a peripheral image of the display panel may become impaired.

In the ocular optical system of each embodiment, in order to desirably correct various aberrations, such as curvature of field and distortion aberration, the lenses are arranged in the following order from the image display surface side to the viewer side as illustrated in the cross-sectional view of the lenses: a first lens L1 having positive refractive power, a second lens L2 of meniscus shape having negative refractive power with its concave surface facing the display panel side, and a third lens L3 having positive refractive power. Diopter adjustment is performed by moving the entire ocular optical system OE along an optical axis direction. In the ocular optical system of each embodiment, let f1 denote a focal length of the first lens L1, let f2 denote a focal length of the second lens L2, and let f denote a focal length of the entire system. Then, the following conditional expressions (1) and (2) are satisfied:

$$0.82 < f1/f < 1.07 \quad (1)$$

$$-0.67 < f2/f < -0.51 \quad (2).$$

Next, technical meaning of each of the conditional expressions (1) and (2) will be described. The conditional expression (1) relates to a ratio of the focal length of the first lens L1 with respect to the focal length of the entire ocular optical system OE. This is a condition under which various aberrations, such as curvature of field and distortion aberration, are suitably corrected while providing a large viewing angle.

If f1/f departs from the upper limit or the lower limit of the conditional expression (1), occurrence of various aberrations, such as curvature of field and distortion aberration, increases. The conditional expression (2) relates to a ratio of the focal length of the second lens L2 with respect to the focal length of the entire ocular optical system OE. This is a condition under which various aberrations, such as curvature of field and distortion aberration, are suitably corrected while providing a large viewing angle. If f2/f departs from the upper limit or the lower limit of the conditional expression (2), occurrence of various aberrations, such as curvature of field and distortion aberration, increases. More desirably, the numerical value ranges of the conditional expressions (1) and (2) are set to the following ranges:

$$0.84 < f1/f < 1.05 \quad (1a)$$

$$-0.65 < f2/f < -0.52 \quad (2a).$$

According to an embodiment of the present invention which has the configuration described above, an ocular optical system having a wide viewing angle and high performance, and is suitable for an electronic viewfinder may be obtained. More desirably, one or more of the following conditions are satisfied in the each ocular optical system of each embodiment. Let f3 denote the focal length of the third lens L3, let r11 and r12 each denote the radius of curvature of the lens surface of the first lens L1 of the image display surface side and of the viewer side, and let r21 and r22 each denote the radius of curvature of the lens surface of the second lens L2 of the image display surface side and of the viewer side. Here, it is desirable that one or more of the following conditional expressions are satisfied:

$$0.60 < f3/f < 0.80 \quad (3)$$

$$-1.50 < (r12+r11)/(r12-r11) < -0.80 \quad (4)$$

$$1.00 < (r22+r21)/(r22-r21) < 1.60 \quad (5).$$

Note that, if the surface of the lens is an aspheric surface, the radius of curvature is calculated using the paraxial radius of curvature.

Next, technical meaning of each of the conditional expressions (1) and (2) will be described. The conditional expression (3) relates to a ratio of the focal length of the third lens L3 with respect to the focal length of the entire ocular optical system OE. This is a condition under which various aberrations, such as curvature of field and distortion aberration, are suitably corrected while providing a large viewing angle. If f3/f departs from the upper limit or the lower limit of the conditional expression (3), occurrence of various aberrations, such as curvature of field and distortion aberration, increases.

The conditional expression (4) defines the lens shape (the shape factor) of the first lens L1. In the conditional expression (4), occurrence of curvature of field and distortion aberration caused by the first lens L1 is reduced by setting such that the curvature of the lens surface of the object side to be small while ensuring a predetermined amount of positive refractive power of the first lens L1.

The conditional expression (5) defines the lens shape of the second lens L2. In the conditional expression (5), occurrence of curvature of field and distortion aberration caused by the second lens L2 is reduced by setting such that the curvature of the lens surface of the object side to be small while ensuring a predetermined amount of negative refractive power of the second lens L2. More desirably, the numerical value ranges of the conditional expressions (3) to (5) are set to the following ranges:

$$0.61 < f3/f < 0.75 \quad (3a)$$

$$-1.40 < (r12+r11)/(r12-r11) < -1.00 \quad (4a)$$

$$1.10 < (r22+r21)/(r22-r21) < 1.50 \quad (5a).$$

By satisfying the aforementioned conditions, an ocular optical system having a sufficiently wide viewing angle and high optical performance while various aberrations, such as curvature of field and astigmatism, being sufficiently corrected is provided in an embodiment of the present invention.

It is desirable that a display panel CO for displaying image information and an image pick-up apparatus in which image information displayed on the display panel CO is viewed using an ocular optical system OE should satisfy the following conditional expression. When H denote a diagonal length of the image display surface of the display panel CO, $$0.50 < H/f < 0.70 \quad (6).$$

The conditional expression (6) relates to a ratio of the diagonal length of the display panel CO with respect to the focal length of the entire ocular optical system OE. The conditional expression (6) represents the condition necessary to obtain a wide viewing angle with a small display panel. If H/f departs from the upper limit or the lower limit of the conditional expression (6), viewing a small display panel at a large viewing angle becomes difficult. More desirably, the numerical value range of the conditional expression (6) is set to the following range:

$$0.52 < H/f < 0.66 \tag{6a}$$

FIG. 9 is a schematic diagram of a main part of the image pick-up apparatus in which the ocular optical system of an embodiment of the present invention is incorporated as an component of the electronic viewfinder. In FIG. 9, the reference numeral 1 denotes an image pick-up apparatus (a camera), such as a digital camera and a video camera. 2 denotes an image pick-up apparatus main body (a camera body). 3 denotes an imaging optical system (an interchangeable lens) which is detachably mounted on the image pick-up apparatus main body 2.

The image pick-up apparatus main body 2 includes a photoelectric conversion element (a solid-state image pickup element) 4 and a signal control unit 5. The photoelectric conversion element 4, which is configured by a CCD, CMOS and the like, photoelectrically converts an image of a subject formed by the imaging optical system 3. The signal control unit 5 processes image information from the photoelectric conversion element 4.

The image pick-up apparatus main body 2 further includes a first display unit 6 and a second display unit 7 on which image information processed by the signal control unit 5 are displayed, and an ocular optical system 8 with which a viewer views the image information displayed on the second display unit 7. The display panel of the first display unit 6, the second display unit 7 and the like are a liquid crystal display panel, an organic EL display panel, and other display panel. The first display unit 6 is disposed on the rear side of the image pick-up apparatus main body 2. The viewer directly views the image information displayed on the first display unit 6. The first display unit 6 may be omitted.

The second display unit 7 constitutes a component of the electronic viewfinder. The imaging optical system 3 may be fixed to the image pick-up apparatus main body 2 instead of being an interchangeable lens. The viewer views the image information displayed on the second display unit 7 from an eye point EP via the ocular optical system 8.

Hereinafter, numerical embodiments corresponding to embodiments of the present invention will be provided. In the numerical embodiments, ω denotes an apparent viewing angle (a half field angle) when the diopter is set to −1 diopter (which is a standard diopter). Hereinafter, in lens data, ri denotes paraxial radius of curvature of the i-th surface and di denotes an on-axis surface interval between the i-th surface and the i+1th surface from the display panel side to the viewer side. Further, Ni denotes a refractive index to the d-line (wavelength: 578.6 nm) of an i-th glass material and νi denotes the Abbe number to the d-line of the i-th glass material. r1 and r2 denote the display panel C0, r9 and r10 denote the protective glass member C4, and r11 denotes the eye point EP.

The unit of the length is [mm] unless otherwise specified. Note that suitable units other than [mm] may also be used because the ocular optical system OE has the same optical performance when enlarged or reduced proportionally. A surface written as an aspheric surface in the column of the paraxial radius of curvature in each numerical embodiment is a surface having an aspheric surface shape as defined by the following Equation 1.

$$x = \frac{\frac{h^2}{R}}{1 + \sqrt{1 - (1+k)\left(\frac{h}{R}\right)^2}} + c_2 h^2 + c_4 h^4 + c_6 h^6 \tag{Equation 1}$$

In Equation 1, x denotes a distance from the peak of the lens surface in an optical axis direction, h denotes a height in the vertical direction to the optical axis, R denotes the paraxial radius of curvature at the peak of the lens surface, k denotes the conic constant, and $c_2$, $c_4$ and $c_6$ each denotes the polynomial coefficient (an aspheric surface coefficient). In the table illustrating the aspheric surface coefficients, "E−i" represents an exponential notation with 10 as a base, i.e., "$10^{-i}$." A relationship between the aforementioned conditional expressions and the numerical values in the numerical embodiments are given in Table 1.

Numerical Embodiment 1

| Entire specification | | |
|---|---|---|
| Focal length | Diagonal length of image display surface of display panel | ω |
| 21.46 | 12.70 | 33.33° |

| Lens data | | | |
|---|---|---|---|
| Paraxial radius of curvature | On-axis surface interval | Refractive index (Nd) | Abbe number (νd) |
| r1 = ∞ | d1 = 1.00 | N0 = 1.52 | ν0 = 64.14 |
| r2 = ∞ | d2 = variable | | |
| r3* = −108.76 | d3 = 4.62 | N1 = 1.53 | ν1 = 56.00 |
| r4* = −10.47 | d4 = 2.87 | | |
| r5* = −7.62 | d5 = 1.75 | N2 = 1.63 | ν2 = 23.90 |
| r6* = −82.64 | d6 = 1.50 | | |
| r7* = 44.91 | d7 = 4.73 | N3 = 1.69 | ν3 = 53.20 |
| r8* = −12.77 | d8 = variable | | |
| r9 = ∞ | d9 = 1.00 | N4 = 1.52 | ν4 = 64.14 |
| r10 = ∞ | d10 = 18.00 | | |
| r11 = ∞ | | | |

| Aspheric surface coefficient | | | |
|---|---|---|---|
| | k | c2 | c4 | c6 |
| r3* | 2.05E+02 | 0.00 | 0.00 | 0.00 |
| r4* | −3.90 | 0.00 | −1.85E−04 | 3.03E−06 |
| r5* | −9.59E−01 | 0.00 | 1.50E−04 | 6.58E−07 |
| r6* | −1.22E+02 | 0.00 | 0.00 | 0.00 |
| r7* | −2.40E+01 | 0.00 | 0.00 | 0.00 |
| r8* | −1.32E+00 | 0.00 | 5.10E−06 | −7.94E−08 |

| Variable interval | | | |
|---|---|---|---|
| Diopter | −1.00 | −3.00 | +1.00 |
| d2 | 8.99 | 8.02 | 9.91 |
| d8 | 2.22 | 3.19 | 1.30 |

Numerical Embodiment 2

Entire specification

| Focal length | Diagonal length of image display surface of display panel | ω |
|---|---|---|
| 22.53 | 12.70 | 31.66° |

Lens data

| Paraxial radius of curvature | On-axis surface interval | Refractive index (Nd) | Abbe number (vd) |
|---|---|---|---|
| r1 = ∞ | d1 = 1.00 | N0 = 1.52 | ν0 = 64.14 |
| r2 = ∞ | d2 = variable | | |
| r3* = −164.21 | d3 = 4.58 | N1 = 1.53 | ν1 = 56.00 |
| r4* = −10.29 | d4 = 2.84 | | |
| r5* = −8.07 | d5 = 1.76 | N2 = 1.63 | ν2 = 23.90 |
| r6* = −77.08 | d6 = 2.09 | | |
| r7* = 35.43 | d7 = 4.52 | N3 = 1.53 | ν3 = 56.00 |
| r8* = −11.32 | d8 = variable | | |
| r9 = ∞ | d9 = 1.00 | N4 = 1.52 | ν4 = 64.14 |
| r10 = ∞ | d10 = 18.00 | | |
| r11 = ∞ | | | |

Aspheric surface coefficient

| | k | c2 | c4 | c6 |
|---|---|---|---|---|
| r3* | 7.28E+01 | 0.00 | 0.00 | 0.00 |
| r4* | −3.67 | 0.00 | −1.48E−04 | 2.42E−06 |
| r5* | −4.87E−01 | 0.00 | 1.97E−04 | 6.58E−07 |
| r6* | 4.88E+01 | 0.00 | 0.00 | 0.00 |
| r7* | −1.13E+01 | 0.00 | 0.00 | 0.00 |
| r8* | −1.11E+00 | 0.00 | 5.18E−06 | 1.15E−08 |

Variable interval

| Diopter | −1.00 | −3.00 | +1.00 |
|---|---|---|---|
| d2 | 9.86 | 8.84 | 10.87 |
| d8 | 1.90 | 2.92 | 0.89 |

Numerical Embodiment 3

Entire specification

| Focal length | Diagonal length of image display surface of display panel | ω |
|---|---|---|
| 20.42 | 12.70 | 34.92° |

Lens data

| Paraxial radius of curvature | On-axis surface interval | Refractive index (Nd) | Abbe number (vd) |
|---|---|---|---|
| r1 = ∞ | d1 = 1.00 | N0 = 1.52 | ν0 = 64.14 |
| r2 = ∞ | d2 = variable | | |
| r3* = −83.64 | d3 = 2.79 | N1 = 1.58 | ν1 = 59.46 |
| r4* = −10.57 | d4 = 2.85 | | |
| r5* = −7.08 | d5 = 2.24 | N2 = 1.82 | ν2 = 24.06 |
| r6* = −38.86 | d6 = 0.85 | | |
| r7* = 23.04 | d7 = 6.75 | N3 = 1.69 | ν3 = 53.20 |
| r8* = −12.94 | d8 = variable | | |
| r9 = ∞ | d9 = 1.00 | N4 = 1.52 | ν4 = 64.14 |
| r10 = ∞ | d10 = 18.00 | | |
| r11 = ∞ | | | |

Aspheric surface coefficient

| | k | c2 | c4 | c6 |
|---|---|---|---|---|
| r3* | 1.23E+02 | 0.00 | 0.00 | 0.00 |
| r4* | −8.23E−01 | 0.00 | −3.46E−05 | 2.03E−06 |
| r5* | −1.41 | 0.00 | 2.06E−05 | 6.58E−07 |
| r6* | −7.34E+01 | 0.00 | 0.00 | 0.00 |
| r7* | −1.62E+01 | 0.00 | 0.00 | 0.00 |
| r8* | −1.22 | 0.00 | 1.71E−06 | −2.68E−08 |

Variable interval

| Diopter | −1.00 | −3.00 | +1.00 |
|---|---|---|---|
| d2 | 8.16 | 7.32 | 8.99 |
| d8 | 1.33 | 2.17 | 0.50 |

Numerical Embodiment 4

Entire specification

| Focal length | Diagonal length of image display surface of display panel | ω |
|---|---|---|
| 23.16 | 12.70 | 30.83° |

Lens data

| Paraxial radius of curvature | On-axis surface interval | Refractive index (Nd) | Abbe number (vd) |
|---|---|---|---|
| r1 = ∞ | d1 = 1.00 | N0 = 1.52 | ν0 = 64.14 |
| r2 = ∞ | d2 = variable | | |
| r3* = −972.38 | d3 = 3.69 | N1 = 1.53 | ν1 = 56.00 |
| r4* = −10.36 | d4 = 2.83 | | |
| r5* = −8.20 | d5 = 1.75 | N2 = 1.63 | ν2 = 23.90 |
| r6* = −88.63 | d6 = 2.11 | | |
| r7* = 30.23 | d7 = 5.28 | N3 = 1.49 | ν3 = 57.40 |
| r8* = −11.35 | d8 = variable | | |
| r9 = ∞ | d9 = 1.00 | N4 = 1.52 | ν4 = 64.14 |
| r10 = ∞ | d10 = 18.00 | | |
| r11 = ∞ | | | |

Aspheric surface coefficient

| | k | c2 | c4 | c6 |
|---|---|---|---|---|
| r3* | 7.76E+03 | 0.00 | 0.00 | 0.00 |
| r4* | −3.65 | 0.00 | −1.62E−04 | 2.26E−06 |
| r5* | −4.62E−01 | 0.00 | 2.04E−04 | 6.58E−07 |
| r6* | 7.33E+01 | 0.00 | 0.00 | 0.00 |
| r7* | −1.57E+01 | 0.00 | 0.00 | 0.00 |
| r8* | −9.88E−01 | 0.00 | 5.21E−06 | 2.02E−08 |

Variable interval

| Diopter | −1.00 | −3.00 | +1.00 |
|---|---|---|---|
| d2 | 10.90 | 9.80 | 11.98 |
| d8 | 1.60 | 2.70 | 0.52 |

TABLE 1

| CONDITIONAL EXPRESSION NO. | EMBODIMENTS | | | |
|---|---|---|---|---|
| | 1 | 2 | 3 | 4 |
| (1) | 1.00 | 1.00 | 1.00 | 0.85 |
| (2) | −0.62 | −0.62 | −0.53 | −0.62 |
| (3) | 0.69 | 0.69 | 0.63 | 0.69 |
| (4) | −1.21 | −1.21 | −1.29 | −1.21 |

TABLE 1-continued

| CONDITIONAL EXPRESSION NO. | EMBODIMENTS | | | |
|---|---|---|---|---|
| | 1 | 2 | 3 | 4 |
| (5) | 1.20 | 1.20 | 1.45 | 1.20 |
| (6) | 0.59 | 0.59 | 0.62 | 0.55 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-106061, filed May 20, 2013, which is hereby incorporated by reference herein in its entirety.

What is claimed is:

1. An ocular optical system used to view an image displayed on an image display surface, comprising: a first lens having positive refractive power, a second lens of meniscus shape having negative refractive power with its concave surface facing the image display surface side, and a third lens having positive refractive power arranged in this order from the image display surface side to a viewer side, wherein, when f1 denotes a focal length of the first lens, f2 denotes a focal length of the second lens and f denotes a focal length of the entire system, the following conditional expressions are satisfied:

$$0.82 < f1/f < 1.07 \text{ and}$$

$$-0.67 < f2/f < -0.51.$$

2. The ocular optical system according to claim 1, wherein, when f3 denotes the focal length of the third lens, the following conditional expression is satisfied:

$$0.60 < f3/f < 0.80.$$

3. The ocular optical system according to claim 1, wherein r11 and r12 each denotes the radius of curvature of the lens surface of the first lens of the image display surface side and of the viewer side, and r21 and r22 each denotes the radius of curvature of the lens surface of the second lens of the image display surface side and of the viewer side, the following conditional expressions are satisfied:

$$-1.50 < (r12+r11)/(r12-r11) < -0.80 \text{ and}$$

$$1.00 < (r22+r21)/(r22-r21) < 1.60.$$

4. The ocular optical system according to claim 1, wherein the first lens has a meniscus shape with its concave surface facing the image display surface side, and the third lens has a biconvex shape.

5. An image pick-up apparatus in which an image displayed on a display panel is viewed via an ocular optical system,
the following conditional expression is satisfied when H denotes a diagonal length of an image display surface of the display panel:

$$0.50 < H/f < 0.70,$$

wherein the ocular optical system includes a first lens having positive refractive power, a second lens of meniscus shape having negative refractive power with its concave surface facing the image display surface side, and a third lens having positive refractive power arranged in this order from the image display surface side to a viewer side, and when f1 denotes a focal length of the first lens, f2 denotes a focal length of the second lens and f denotes a focal length of the entire system, the following conditional expressions are satisfied:

$$0.82 < f1/f < 1.07 \text{ and}$$

$$-0.67 < f2/f < -0.51.$$

6. The image pick-up apparatus according to claim 5, wherein diopter adjustment is performed by moving the entire ocular optical system in an optical axis direction.

* * * * *